No. 818,445. PATENTED APR. 24, 1906.
H. HOLTON.
BERRY SEED SEPARATOR.
APPLICATION FILED JUNE 28, 1905.

Witnesses
Louis D. Heinrichs
Herbert D. Lawson

Inventor
Howard Holton
By W. J. FitzGerald & Co.,
Attorneys

UNITED STATES PATENT OFFICE.

HOWARD HOLTON, OF AMSTERDAM, NEW YORK.

BERRY-SEED SEPARATOR.

No. 818,445.  Specification of Letters Patent.  Patented April 24, 1906.

Application filed June 28, 1905. Serial No. 267,412.

*To all whom it may concern:*

Be it known that I, HOWARD HOLTON, a citizen of the United States, residing at Amsterdam, in the county of Montgomery and State of New York, have invented certain new and useful Improvements in Berry-Seed Separators; and I do hereby declare the following to be a full, clear, and exact description of the invention, such as will enable others skilled in the art to which it appertains to make and use the same.

My invention relates to separators, and it is more particularly a device for extracting the juice and pulp from berries.

The object of the invention is to provide a simple, inexpensive, and durable device of this character which will quickly cut and compress the berries and which is provided with means whereby the seeds will be retained while the juice and pulp will be forced into any suitable receptacle provided for it.

The invention consists of a perforated receptacle having a perforated bottom supported at a suitable distance from the lower end thereof, and this receptacle is adapted to receive a hollow plunger in which is seated a cutting-tool having a handle extending from it.

The cutting-tool can be removed from the plunger and used independently thereof for the purpose of chopping the berries, and after they have been chopped the cutting-tool is inserted into and locked in the plunger so that by manipulating the same handle again the cut berries can be pressed to force the pulp and juice through the apertures. The invention also consists of the further novel features of construction and combination of parts hereinafter more clearly set forth, and pointed out in the claims.

In the accompanying drawings I have shown the preferred form of my invention.

Figure 1:
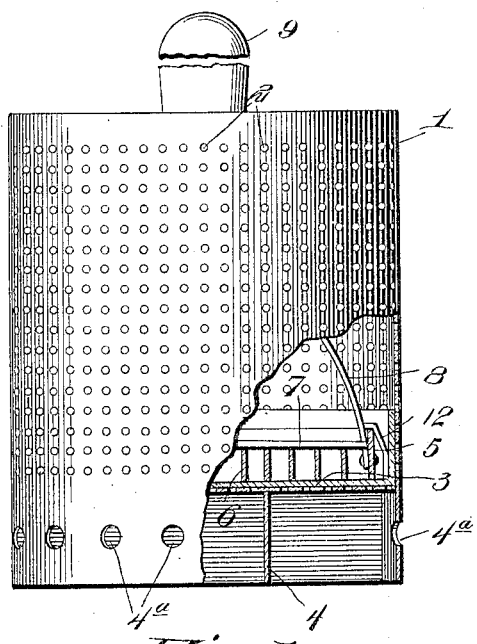
Figure 2:
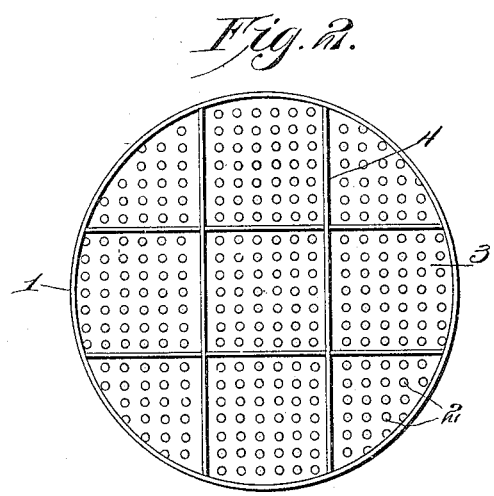
Figure 3:
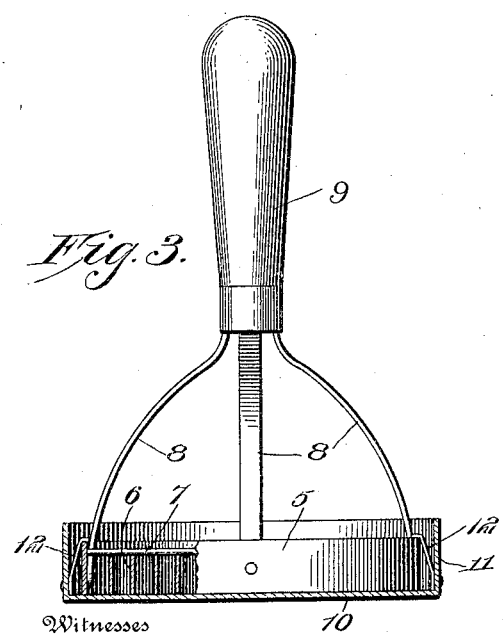
Figure 4:
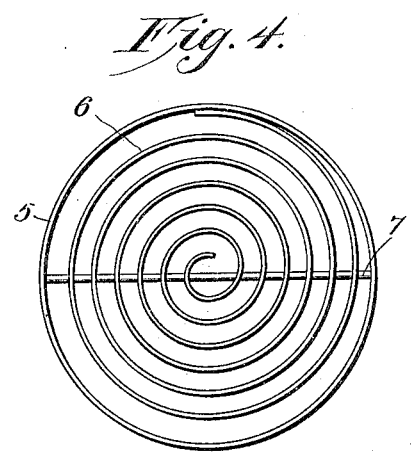

In said drawings, Figure 1 is a view, partly in elevation and partly in section, of the cylinder. Fig. 2 is a bottom plan view thereof. Fig. 3 is a section through the plunger and showing the cutting-tool locked therein, said tool being partly in elevation and partly in section; and Fig. 4 is a bottom plan view of the cutting-tool with the handle removed.

Referring to the figures by numerals of reference, 1 is a receptacle, preferably cylindrical in form and having its wall provided with a large number of perforations 2, which are too small to permit the passage of a berry-seed therethrough. These small perforations extend downward as far as the bottom 3 of the receptacle, which is located at a point removed from the lower end and has a series of perforations therein. The bottom is supported by transversely-extending partitions 4, and that portion of the wall of the receptacle located below the bottom has large apertures $4^a$ therein, so that the juice which may accumulate beneath the bottom can readily flow out from the receptacle.

The cutting-tool used in connection with the receptacle preferably consists of a ring 5, having a strip of metal 6 coiled therein, and the coils are maintained a proper distance apart by a transversely-extending strip 7, which is soldered or otherwise secured to the upper edges of the coil. The lower edges of the coil are all in the same plane with the lower edge of the ring. Arms 8 extend upward from the coil at desired intervals and are secured to the handle 9.

The third member of the separator consists of a disk 10, having an annular flange 11, and the cutting-tool is adapted to be placed upon the disk and surrounded by the flange. Spring-catches 12 are secured to the inner surface of the flange, and when the tool is inserted these spring-catches automatically engage the ring 5 and hold it in position.

The disk and its flange constitute a plunger for compressing the berries so as to extract the juice and pulp. The berries having been placed within the receptacle and upon the bottom 3, the cutting-tool is forced downward upon them a number of times and serves to finely divide the material. Said tool is then inserted in the plunger and is automatically locked in position by the catches 12. As the plunger fits snugly within the receptacle 1, the fruit will be pressed through the apertures in the wall and bottom of said receptacle, and as the seeds cannot be forced through the apertures they will be retained in the receptacle while the desirable portions will pass into any suitable receptacle in which the separator may be placed.

It will be seen that this device is very simple and durable and constitutes an efficient means for separating the seeds from berries and other like juicy fruits. Receptacles having different sizes of apertures may be utilized for adapting the device for use with different berries and fruits.

Having thus described my invention, what I claim as new, and desire to secure by Letters Patent, is—

1. In a separator, the combination with a perforated receptacle; of a plunger adapted to slide within the receptacle, a cutting-tool detachably secured within the plunger, and a handle connected to the cutting-tool.

2. In a separator, the combination with a perforated receptacle; of a plunger, a ring therein, a coiled blade secured within the ring, a handle connected to the ring and means for detachably securing the ring within the plunger.

3. In a separator, a cutting-tool comprising a ring, a coiled blade secured therein, one edge of the ring and the blade being in the same plane, means for holding the coils at proper distances apart, and a handle connected to the ring.

In testimony whereof I have signed my name to this specification in the presence of two subscribing witnesses.

HOWARD HOLTON.

Witnesses:
MATT LEW DUYER,
CHRISTOPHER J. HEFFERNAN.